July 7, 1953  J. H. SUTTON  2,644,386
ROTARY SOIL TILLER
Filed Oct. 9, 1947  3 Sheets-Sheet 1

J. H. Sutton
INVENTOR

BY CA Snow Co.
ATTORNEYS.

July 7, 1953    J. H. SUTTON    2,644,386
ROTARY SOIL TILLER
Filed Oct. 9, 1947    3 Sheets-Sheet 2
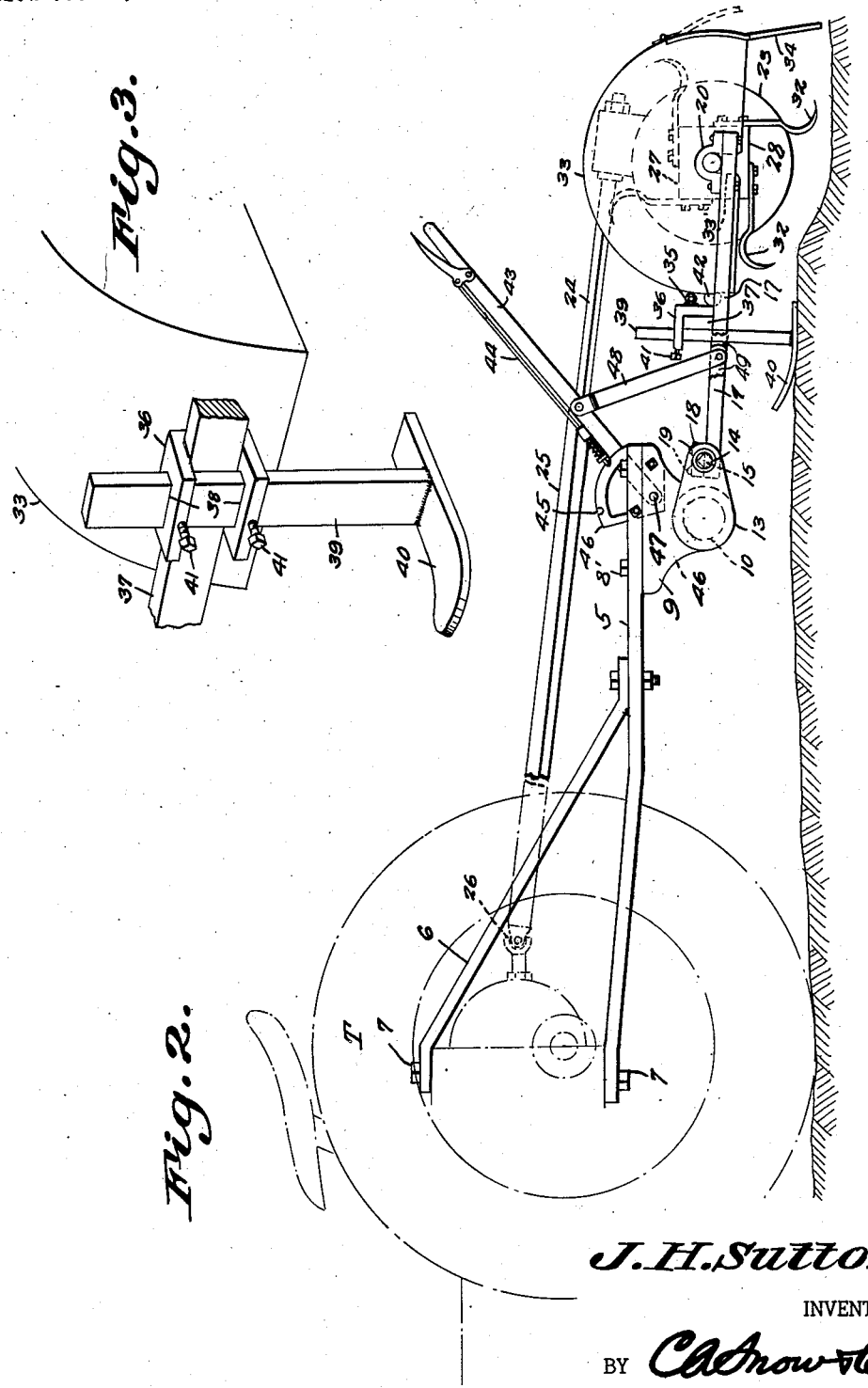
J. H. Sutton
INVENTOR
BY C. A. Snow & Co.
ATTORNEYS.

July 7, 1953  J. H. SUTTON  2,644,386
ROTARY SOIL TILLER
Filed Oct. 9, 1947  3 Sheets-Sheet 3
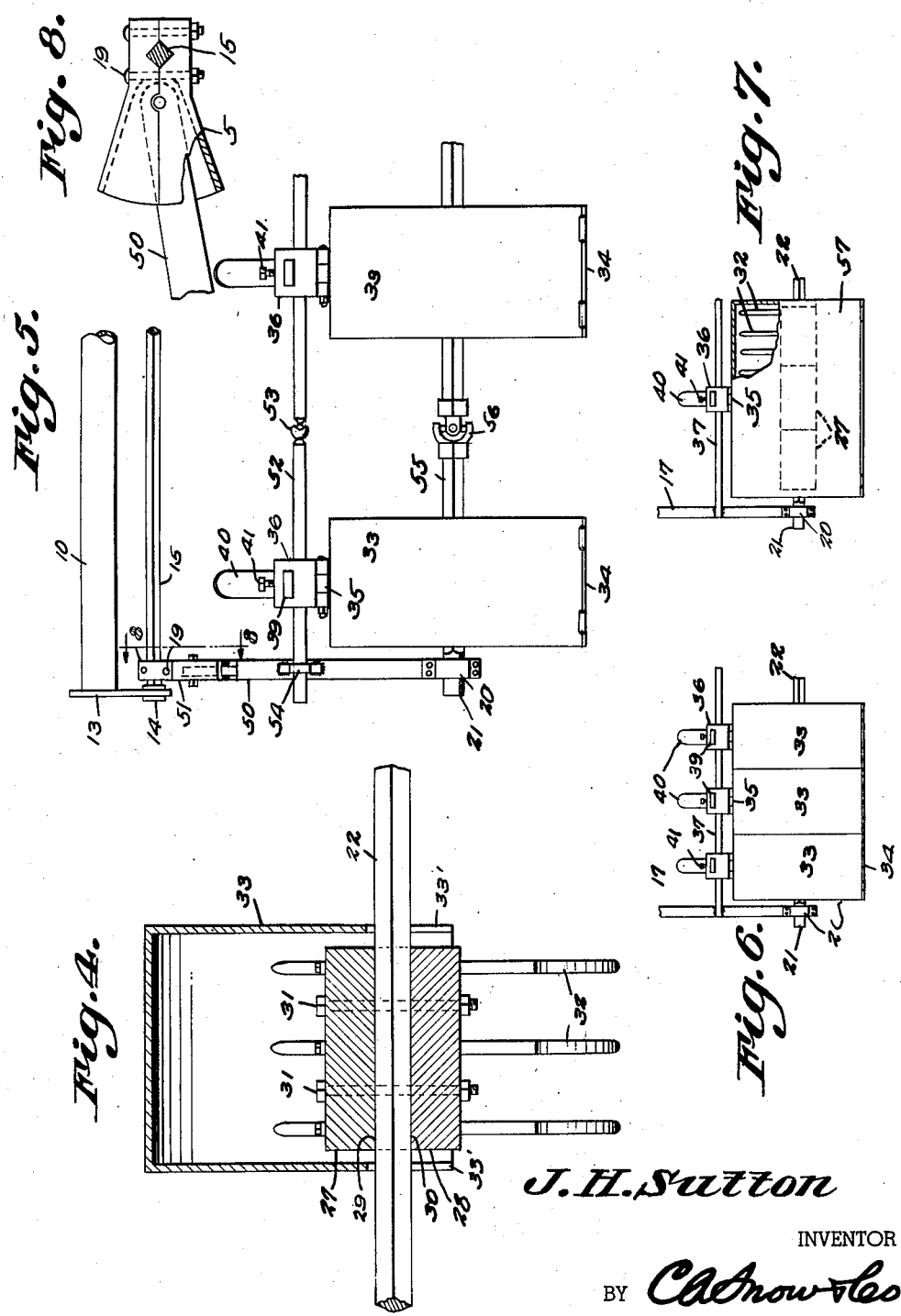
J. H. Sutton
INVENTOR
BY C. A. Snow & Co.
ATTORNEYS.

Patented July 7, 1953

2,644,386

UNITED STATES PATENT OFFICE 2,644,386

ROTARY SOIL TILLER

John H. Sutton, Los Angeles, Calif.

Application October 9, 1947, Serial No. 778,824

3 Claims. (Cl. 97—40)

This invention relates to machines used for the purpose of tilling soil, and more particularly, has reference to machines of the character described, that are of the rotary type.

Various types of tillage devices are in common use, and some of these are of the rotary type. However, with the machines commonly used, it is necessary that the entire surface of a field be worked thereby, to a proper stage of pulverization of the soil. This is a wasteful practice, since it is clear that so far as actual tillage requirements are concerned, only those portions of the soil in which seed is actually to be planted should be pulverized.

One important object of the invention, therefore, is to provide a rotary type tiller which can be used as an "in-row" tiller, that is, a machine wherein the actual tillage units each pulverize the soil in a plurality of spaced rows, as the machine moves across the field.

Another important object of the invention is to provide a machine of the type stated which is so constructed as to be adjustable to produce wide or narrow rows, widely spaced rows, and closely spaced rows.

Still another object is to produce a tilling machine which can be adjusted so as to produce rows of the characteristics described above, and wherein the machine can be moved back over said rows so as to pulverize the soil between the rows, readily accomplishing total tillage, if desired.

Still another object of the invention is to provide a tiller construction which is capable of adjustment as to the depth of cut, can be readily lifted completely out of operative position, has novel means for leveling the soil broken up while preventing clogging of the tines.

Another important object is to provide a novelly formed flexible tiller construction, wherein rocks or uneven ground encountered by any of the tillage units carried thereby will not affect the efficient functioning of any of the other units.

Still another object of the invention is to provide a machine which will meet the purposes above-stated, and which is yet capable of being constructed economically, and operated with equal economy the machine yet being unusually durable and fully efficient in properly pulverizing the soil in the manner described.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 2 is a side elevational view thereof, showing the machine in operative position, attached to a tractor, the tractor and part of the drive shaft of the machine being shown in dotted line.

Figure 3 is an enlarged detail perspective view of a depth adjusting means embodied in the invention, portions of cooperating parts of the machine being broken away.

Figure 4 is a view taken on line 4—4 of Figure 1.

Figure 5 is a top plan view showing one end of a modified form, the rest of the machine being broken away.

Figure 6 is a top plan view on a reduced scale showing fragmentarily one end of the first form, with the tillage units being grouped in an adjusted position.

Figure 7 is a view similar to Figure 6, in which a modified type of hood is illustrated.

Figure 8 is a view on line 8—8 of Figure 5.

Figure 1:
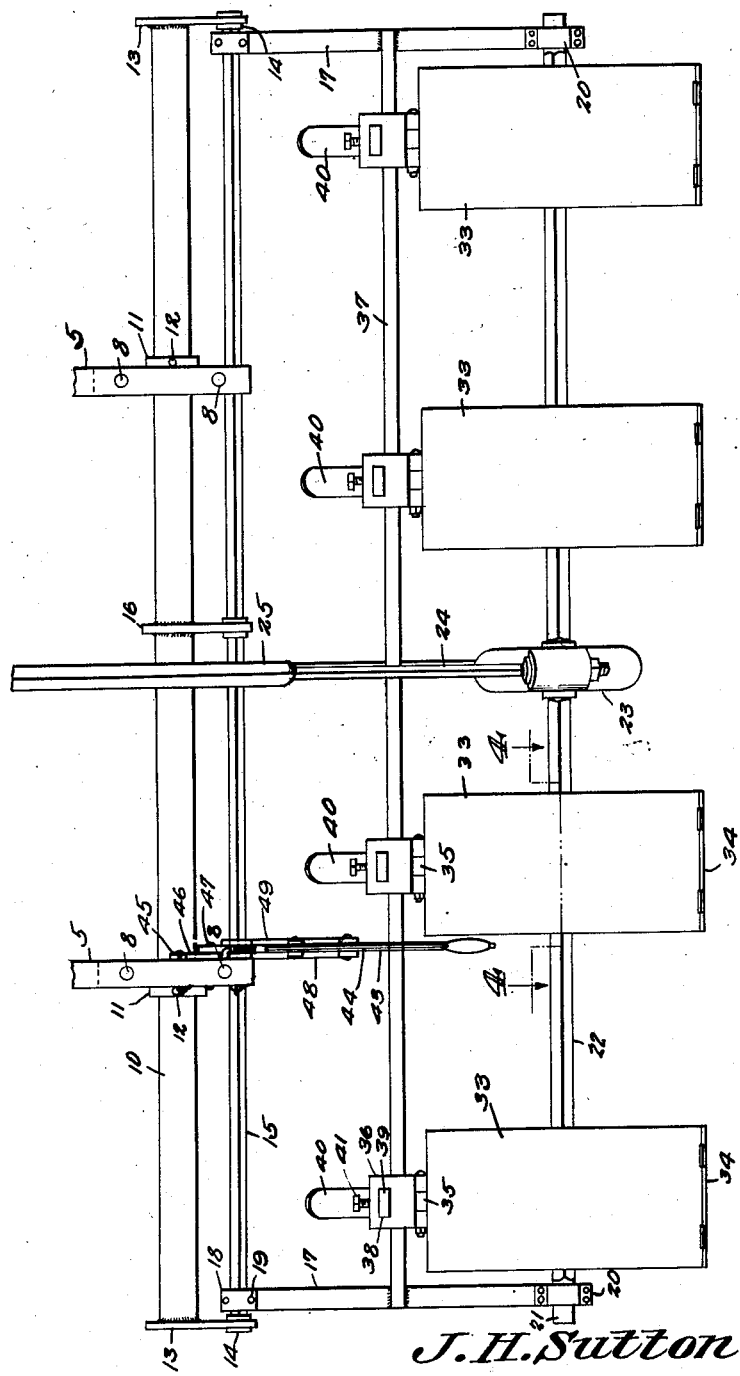
Figure 1 is a top plan view of one form of a rotary tilling machine constructed in accordance with the invention.

Referring to the drawings in detail, the reference numeral 5 designates extension arms rigidly joined to brace members 6. The arms 5 and members 6 are rigidly connected, as by bolts 7, to a tractor T, truck, or other vehicle. The specific form of connection may of course vary, depending on the make of vehicle and the point of attachment thereto, that is, to the front of, below, or in back of the vehicle.

The extension arms have suitable openings for receiving studs 8, on spaced brackets 9, with the studs being engaged by nuts 8'. In each bracket 9, there is rotatably mounted a tubular draw bar 10. Stop collars 11 may be clamped to the draw bar 10 by means of set screws 12, and prevent lateral movement of the draw bar 10 relative to brackets 9.

To the ends of the draw bar 10 are rigidly connected, as by welding or the like, crank plates 13. The draw bar and its associated parts constitute the front portion of the frame of the machine, while the remaining parts of the frame to be described constitute a rear portion.

The crank plates extend rearwardly from the draw bar a short distance, and in their rearwardly extended ends are provided bearings 14 in which are journaled for rotation the ends of a non-circular rock shaft 15.

From the above, it is seen that draw bar 10 may be partially rotated or rocked relative to its connection to tractor T, and that rock shaft 15 is not only mounted so as to be individually rotatable, but also, swingable in an arc around the axis of the draw bar 10.

An intermediate crank plate 16 is preferably employed to strengthen and reinforce the connection between draw bar 10 and rock shaft 15.

To the rock shaft 15 are fixedly but removably connected the front ends of arms 17. This connection can be accomplished, as may be readily recognized, by forming an angular recess adjacent one end of each arm, in which is received the rock shaft 15. Then, a clamping block 18, having a similar opposed recess, is secured to each arm 17 by means of bolts 19 or the like.

To the other ends of the arms 17 are connected bearings 20, in which are journaled for rotation the rounded ends 21 of a transversely polygonal tiller shaft 22. Intermediate its ends, shaft 22 passes through a gear box 23 and is operatively connected through suitable gearing contained in the gear box to a drive shaft comprising the telescoping shaft members 24 and 25. The forward end of shaft 25 is operatively connected by means of universal joint 26 to the power take-off of the tractor T. Thus, rotation of the drive shaft is transmitted through gear box 23 to the tiller shaft 22.

At spaced intervals on the tiller shaft 22, tiller units are mounted for rotation thereby (Figure 4). Each unit includes a pair of opposed blocks 27 and 28, each block having an angular recess, these being respectively designated 29 and 30. Recesses 29 and 30 receive shaft 22. The blocks are removably clamped in engagement with each other and with the shaft by means of bolt and nut means 31. By loosening these fastening means, the tiller unit can be moved longitudinally of shaft 22, and fixed in adjusted positions longitudinally of the shaft. To the outer surfaces of the blocks are connected (Figures 2 and 4) a plurality of circularly disposed tines or spring teeth 32 the free ends of which are curved as best shown in Figure 2.

A semi-circular hood 33 covers each tiller unit these being formed with opposed recesses 33' in their sides. Shaft 22 passes through these recesses, but is spaced from the walls thereof.

To the rear ends of the hood 33 are connected hinge sections 34, these being adapted to level soil pulverized by the tines 32, and being additionally adapted to prevent clogging of the tines. Should a clod of dirt or the like become impaled upon any of the tines, the hinge sections 34, or the hood 33, serve to break the clods from the tines.

By means of hinges 35 at the front of the hood 33, the hoods are connected to U-shaped brackets 36 (Figure 3), the forwardly directed arms of which embrace a supporting bar 37, the ends of which are welded or otherwise fixedly attached to the end bars 17. Aligned openings 38 are formed in the arms of the brackets 36, and these openings are preferably non-circular as best shown in Figure 3.

These openings receive depth adjustment bars 39, to the lower ends of which are fixedly attached shoes 40. The adjustment bars 39 can be clamped to brackets 36 in any desired position of adjustment, by means of set screws 41.

To limit downward swinging of the hoods 33 past a desired point, lugs 42 are provided on each hood below the hinges 35, and it is seen that these will engage the rear wall of bracket 36 and serve as a stop limiting further downward swinging of the hood.

For the purpose of raising the whole machine out of operative position, as when moving the machine to or from the field of operation, I provide a lifting means that includes an operating handle 43, carrying the spring latch 44. Spring latch 44 is engageable in a single notch 45 formed in the arcuate surface of a latch plate 46 that is fixed to one of the brackets 9. The operating handle 43 is pivotally connected to this plate, as shown at 47.

Intermediate the ends of the operating handle 43, there is pivotally connected thereto one end of a link 48, the other end of which is pivoted to one end of a lifting bar 49, the other end of said bar being rigidly connected to the cross member 15.

The purpose of providing one notch 45 is to permit flexibility of movement of the tiller units and the framework supporting these units, relative to the draw bar 10. In other words, as the tiller units rise and fall while moving over the ground, the spring latch will move back and forth over the surface of plate 46. However, when it is desired to raise the tiller units into inoperative position, the spring latch can be moved into engagement with notch 45, thus holding the entire ground-engaging portions of the machine in raised position.

When the machine is to be used, it is first lowered by disengagement of spring latch 44 with latch plate 46. Next, the depth adjustment can be effected, by loosening set screws 41 and positioning the adjusting bar 39 as desired. As will be seen, since shoe 40 is in continuous engagement with the ground, this causes the tiller units to be raised or lowered to adjustable positions relative to the ground engaged by the tiller units. Any number of these units can, of course, be mounted upon shaft 22, and they can be grouped together for the purpose of wide rows, as shown in Figure 6, or they can be spaced apart as shown in Figure 1 for the purpose of forming narrow rows. Additionally, they can be removed in favor of other tiller units smaller or greater in length. It is seen that various combinations are therefore possible, so as to produce a desired number of wide rows, or of narrow rows, as necessary. The brackets 36, of course, slide longitudinally of supporting bar 37, in making these adjustments.

If saturation tillage is desired, covering the entire area of the field, the units can be positioned one against the other for the entire length of shaft 22, with the exception, of course, of the space required for the gear box 23. Or, the same results can be achieved by tilling spaced rows, and then moving back between the rows.

The shaft 22, as will be recognized, can be rotated at any desired speed.

Flexibility in the machine is permitted, when it passes over uneven surfaces, by the fact that draw bar 10 is rotatable relative to the tractor connection 5, and the secondary draw bar or cross member 15 is not only separately rotatable, but also can swing around the axis of the draw bar 10. At this point, it should be noted that in smaller units, draw bar 10 could be dispensed with, and the secondary draw bar alone used.

It may be, however, that the ground is unusually uneven or rocky, and where these conditions are encountered, the machine can be of modified construction, as shown in Figure 5. In this modification, I prefer to use, in place of the end bars 17, end bars 50, pivotally connected to the secondary draw bar 15 for limited vertical swinging by compositely formed flared brackets 51. The supporting bar 52, having ball and socket joints 53, is also used, in place of the previously described supporting bar 37. Bar 52 can be provided with a ball and socket joint 53 at spaced intervals throughout its length as for example, by providing a joint of this type between each tiller unit. It is desirable, in such an instance, that the connection of the supporting bar to the end bars be not rigid, and accordingly, they are connected to the end bars by means of brackets 54 in which they are relatively movable.

Similarly, in place of the regular shaft 22, I provide a jointed tiller unit shaft 55, having at spaced intervals along its length, the universal connection 56.

From the above, it is seen that should any individual tiller unit strike a projection in the ground, or should the ground be very uneven, any unit can rise or fall without substantially affecting any other unit, and such a unit, when striking a projection such as a rock, can move over the projection without raising the entire assembly. Yet, the driving connection whereby all the units are powered, is not destroyed.

In Figure 7, a modified form of hood is illustrated, this being in the nature of a large hood adapted to cover a number of tiller units, or a tiller unit of elongated form.

Applicant has not, obviously, attempted to show all possible variations of design whereby the results achieved by application of the invention can be obtained, the illustrated and described structures being merely the best, and presently preferred, construction so far devised by applicant.

An important characteristic of applicant's invention is its ready adaptability for unusually diversified tilling conditions. Other important characteristics are its inherent flexibility in operation, and the wide range of adjustment as to depth and width of the rows to be tilled. Apart and distinct from all these, and of basic importance in the invention, is the fact that it achieves the very desirable result of "in-row" tillage by a rotary type tiller, and with full latitude permitted as to varying the depth, width, number, and amount of space between these rows.

What is claimed is:

1. A soil tiller adapted to be attached to a farm tractor of the type having a power take off, said tiller comprising a draw bar carried by the tractor for rotation about a horizontal axis which extends perpendicularly to the longitudinal axis of the tractor, crank plates carried by the draw bar and extending laterally therefrom, a rock shaft mounted in the crank plates for rotation about an axis which lies parallel to the horizontal axis, supporting arms carried by the rock shaft for movement therewith about the parallel axis, a tiller shaft carried by the supporting arms for rotation about a horizontal axis which lies in spaced parallel relation to the parallel axis, earth working implements mounted on the tiller shaft for rotation thereby and means connected to the power take off and to the tiller shaft for establishing driving connection between the power take off and the implement shaft.

2. The structure defined in claim 1 in which shoes are carried by the supporting arms between the tiller shaft and the draw bar for following the contour of the earth and regulating the depth to which the earth is worked by the implements.

3. The structure defined in claim 1 in which means is carried by the tractor and connected to a supporting arm for tilting the supporting arms about the axis of the rock shaft.

JOHN H. SUTTON.

References Cited in the file of this patent

UNITED STATES PATENTS

| Number | Name | Date |
|---|---|---|
| 464,561 | Gasser | Dec. 8, 1891 |
| 1,172,572 | Wade | Feb. 22, 1916 |
| 1,318,419 | Vathing et al. | Oct. 14, 1919 |
| 1,505,201 | Johnson | Aug. 19, 1924 |
| 1,574,654 | Howard | Feb. 23, 1926 |
| 1,600,215 | Clarkson | Sept. 21, 1926 |
| 1,836,666 | Katzfey | Dec. 15, 1931 |
| 1,880,113 | Smith | Sept. 27, 1932 |
| 1,887,348 | Freeman | Nov. 8, 1932 |
| 2,046,046 | Washington | June 30, 1936 |
| 2,134,438 | Click | Oct. 25, 1938 |
| 2,175,511 | Wahlstrom et al. | Oct. 10, 1939 |
| 2,176,261 | Kelsey | Oct. 13, 1939 |
| 2,317,188 | Hanson | Apr. 20, 1943 |
| 2,322,076 | Watson | June 15, 1943 |
| 2,361,798 | Smith | Oct. 31, 1944 |
| 2,364,043 | Ariens | Dec. 5, 1944 |
| 2,442,731 | Paul | June 1, 1948 |